United States Patent
Russell et al.

(10) Patent No.: US 8,012,278 B2
(45) Date of Patent: Sep. 6, 2011

(54) END-TO-END JOINING OF NANOTUBES

(75) Inventors: Alan J. Russell, Gibsonia, PA (US);
Sang B. Lee, Harrison City, PA (US)

(73) Assignee: University of Pittsburgh—of the Commonwealth System of Higher Education, Pittsburgh, PA (US)

( * ) Notice: Subject to any disclaimer, the term of this patent is extended or adjusted under 35 U.S.C. 154(b) by 1072 days.

(21) Appl. No.: 11/796,492

(22) Filed: Apr. 27, 2007

(65) Prior Publication Data

US 2010/0137541 A1    Jun. 3, 2010

Related U.S. Application Data

(60) Provisional application No. 60/796,283, filed on Apr. 28, 2006.

(51) Int. Cl.
*B32B 3/00* (2006.01)
*B29C 65/00* (2006.01)
(52) U.S. Cl. ............. 156/47; 156/272.2; 423/445 R; 977/762; 977/788
(58) Field of Classification Search .......... 522/171, 522/173; 526/285; 156/275.5, 296, 272.2, 156/47; 977/797, 712, 762, 788; 423/455 R
See application file for complete search history.

(56) References Cited

U.S. PATENT DOCUMENTS

| | | | |
|---|---|---|---|
| 4,990,291 A | 2/1991 | Shoen | |
| 5,004,566 A * | 4/1991 | Schnur et al. | 554/80 |
| 6,013,206 A * | 1/2000 | Price et al. | 264/4.1 |
| 6,712,864 B2 * | 3/2004 | Horiuchi et al. | 23/314 |
| 7,049,152 B2 | 5/2006 | Stevens | |
| 7,179,784 B2 | 2/2007 | Zhang | |
| 7,491,699 B2 * | 2/2009 | Reches et al. | 514/12 |
| 7,611,687 B1 * | 11/2009 | Harutyunyan | 423/460 |
| 7,666,911 B2 * | 2/2010 | Russell et al. | 514/614 |
| 2002/0092613 A1 | 7/2002 | Kuper | |
| 2004/0146560 A1 | 7/2004 | Whiteford | |
| 2004/0247808 A1 | 12/2004 | Cooper | |
| 2006/0079626 A1 | 4/2006 | Curran | |
| 2007/0232699 A1 | 10/2007 | Russell | |
| 2007/0248950 A1 * | 10/2007 | Reppy et al. | 435/5 |

FOREIGN PATENT DOCUMENTS

| | | |
|---|---|---|
| WO | WO 2005/072093 | 8/2005 |
| WO | WO 2006/085896 | 8/2006 |
| WO | WO 2006/132662 | 12/2006 |

(Continued)

OTHER PUBLICATIONS

Dettlaff-Weglikowska et al, "Chemical Functionalization of Single Walled Carbon Nanotubes", Current Applied Physics 2, pp. 497-501 (2002).*

(Continued)

*Primary Examiner* — Susan W Berman
(74) *Attorney, Agent, or Firm* — Bartony & Associates LLC

(57) ABSTRACT

A method for joining nanotubes end-to-end, includes contacting the nanotubes with a joining fluid. The joining fluid has at least one property that is different from at least one property associated with ends of the nanotubes. In one embodiment, the method further includes contacting the nanotubes with a first, treating fluid and removing the bulk first fluid before the nanotubes are contacted with the joining fluid. The joining fluid is immiscible in the treating fluid to effect end-to-end joining of the nanotubes.

49 Claims, 2 Drawing Sheets

FOREIGN PATENT DOCUMENTS

| WO | WO 2008/048241 | 4/2008 |
|---|---|---|
| WO | WO 2008/051302 | 5/2008 |

OTHER PUBLICATIONS

Lijima, Sumio et al.; Single-Shell Carbon Nanotubes of 1-nm Diameter; Nature; vol. 363; 1993, pp. 603-605.

Hirsch, Andreas; Functionalization of Single-Walled Carbon Nanotubes; Angew. Chem. Int. Ed; 2002; 41; No. 11; pp. 1853-1859.

Yager, Paul et al.; Molecular Crystals and Liquid Crystals (Abstract); vol. 106, 371 (1984) (Abstract).

Thomas et al., Lipid Tubule Self-Assembly: Length Dependence on Cooling Rate Through a First-Order Phase Transition; Science vol. 267,(1995), pp. 1635-1638.

Svenson, Sonke et al.; Formation of Polymerizable Phospholipid Nanotubules and Their Transformation into a Network Gel; Langmuir; 1999; 15; pp. 4464-4471.

Seddon et al., Chiral Templating of Silica-Lipid Lamellar Mesophase with Helical Tubular Architecture, Angew. Chem. Int. Ed., vol. 41, (2002), pp. 2988-2991.

Wang, Guijun et al.; Easily Accessible Uniform Wide-Diameter Helical, Cylindrical, and Nested Diacetylene Superstructures that can be Metallized and Oriented in Magnetic Fields; Langmuir; 1999; 15; pp. 6135-6138.

Thomas, Britt N. et al.; Phosphonate Lipid Tubules II; J. Am. Chem. Soc.; vol. 124; No. 7; 2002; pp. 1227-1233.

Lee, Sang Beom et al.; Self-Assembly of Biocidal Nanotubes from a Single-Chain Diacetylene Amine Salt; J. Am. Chem. Soc.; 2004; 126; pp. 13400-13405.

Spector, Mark S. et al.; Chiral Self-Assembly of Nanotubules and Ribbons from Phospholipid Mixtures; Nanoletters; 2001; vol. 1; No. 7; pp. 375-378.

Lee, Sang Beom et al.; Surface Dispersion and Hardening of Self-Assembled Diacetylene Nanotubes; Nanoletters; 2005; vol. 5; No. 11; pp. 2202-2206.

Suh, J. S. et al.; Linearly Joined Carbon Nanotubes; Synthetic Metals; 2001; 123; pp. 381-383.

* cited by examiner

Fig. 2A
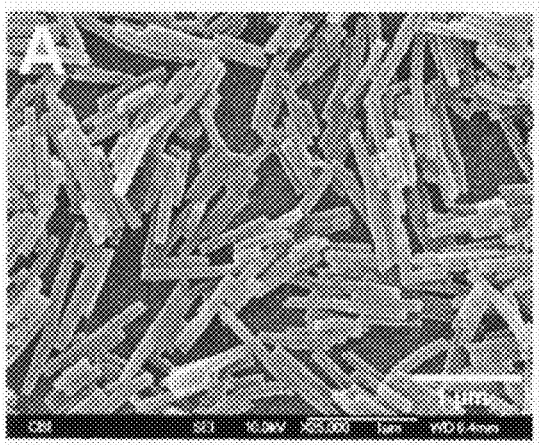
Fig. 2B
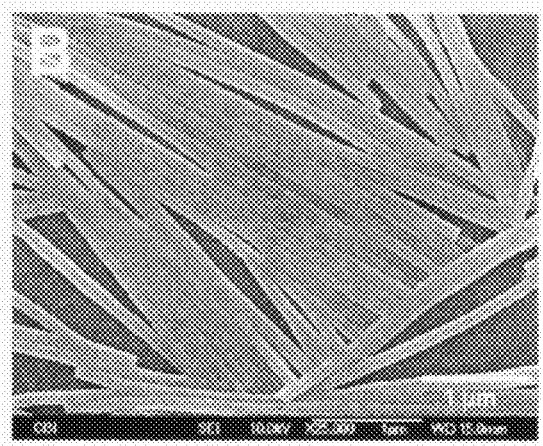
Fig. 2C
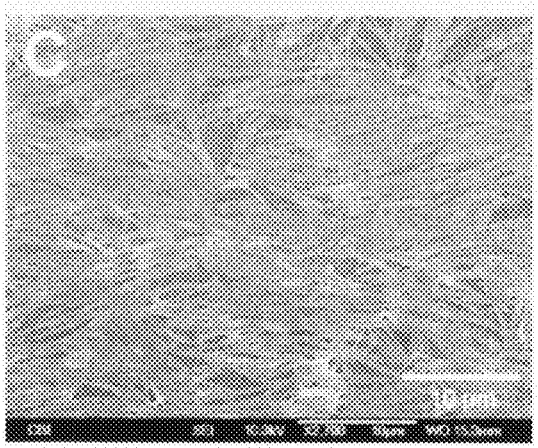
Fig. 3A
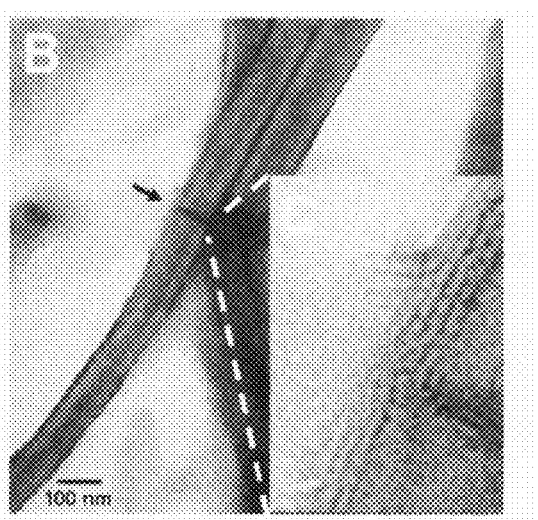
Fig. 3B

END-TO-END JOINING OF NANOTUBES

CROSS-REFERENCE TO RELATED APPLICATIONS

This application claims benefit of U.S. Provisional patent application Ser. No. 60/796,283, filed Apr. 28, 2006, the disclosure of which is incorporated herein by reference.

STATEMENT OF GOVERNMENT INTEREST

This invention was made with government support under the Department of Defense Multidisciplinary University Research Initiative (MURI) Grant No. DAAD19-01-1-0619. As such, the United States government has certain rights in this invention.

BACKGROUND OF THE INVENTION

The present invention relates generally to end-to-end joining of nanotubes, and, particularly to methods of end-to-end joining of nanotubes based upon physiochemical properties of the nanotube ends.

Tubular microstructures including carbon and other nanotubes have attracted enormous attention over the past decade as a result of their potential significance in microelectronic devices and nanobiotechnology (Iijima et al., *Nature* vol. 363, 603 (1993); Hirsch et al., *Angew. Chem. Int. Ed.* vol. 41, 1853 (2002)). One of the primary reasons for using nanotubes on these applications is their hollow structures that can transport biomaterials as well as electronic signals, and also can provide a space for cell growth. For this objective, the control of nanotubes in diameter and length is essential to enhance the selectivity and detection limit of nanotubes against target materials. Along with the carbon nanotubes, diacetylene nanotubes were observed by Schoen and Yager (*Mol. Cryst. Liq. Cryst.* vol. 106, 371 (1984)) as having assembled in water from liposomes of the two-chain chiral lipid diacetylene, 1,2-bis(tricosa-10,12-diynoyl)-sn-glycero-3-phosphocholine ("$DC_{8,9}PC$"). Tubules formed from $DC_{8,9}PC$ have an average diameter of 0.5 µm and lengths which range from 50 to 200 µm. The size and stability of these tubules were sensitive to preparation conditions and thermal history, resulting in a non-homogenous preparation. Other work with chiral lipids bearing two diacetylenic chains has demonstrated that it is difficult to generate uniform nanotube structures from these precursors (see, e.g., Thomas et al., *Science* vol. 267, 1635 (1995); Spector et al., *Nano Letters* vol. 1, 375 (1984); Wand et al., *Langmuir* vol. 15, 6135 (1999); Svenson et al., *Langmuir* vol. 15, 4464 (1999); Seddon et al., *Angew. Chem. Int. Ed.* vol. 41, 2988 (2002); and Thomas et al., *J. Am. Chem. Soc.* vol. 124, 1227 (2002), the disclosures of which are incorporated herein by reference).

Various attempts have been made to control nanotubes diameters and lengths by changing chemical modification and fabrication method of amphiphilic diacetylene lipids. Schoen et al. have discussed method of making lipid tubules composed of chiral diacetylenic phosphocholine by a cooling process. See, U.S. Pat. No. 4,990,291. The diacetylenic phosphocholines have distinctly different endothermic and exothermic transition temperatures. Lipid tubules can be formed by hydrating a diacetylenic phosphocholine at a temperature above its endothermic transition temperature then slowly lowering the temperature. However, the tubule-like structures discussed in these publications were quite heterogeneous.

It remains desirable to develop compositions, systems and methods to improve control of nanotube dimensions.

SUMMARY OF THE INVENTION

In several embodiments, the present invention provides methods for variation and control of nanotube dimensions, and particularly length, via end-to-end joining of nanotubes without the use of templates. Further, the present invention also provides methods for permanently joining end-to-end nanotubes of the present invention (for example, via the polymerization of polymerizable end-to-end joined nanotubes of the present invention). Nanotubes suitable for use in the present invention include, but are not limited to, diacetylenic nanotubes, carbon nanotubes, silica nanotubes, porphyrin nanotubes, boron nitride nanotubes, tungsten disulfide nanotubes, zeolite nanotubes, polymeric lipid-based nanotubes, carbohydrate-based nanotubes, peptide nanotubes, $WS_2$ nanotubes, vanadium oxide nanotubes, polyaniline nanotubes, Au nanotubes, gallium nitride nanotubes, Fullerene nanotubes, $MoS_2$ nanotubes, InP nanotubes, rhenium(IV) sulfide nanotubes, steroid nanotubes, alumina nanotubes, titania nanotubes, tellurium nanotubes, $NbS_2$ nanotubes, block copolymer nanotubes and combinations thereof.

In one aspect, the present invention provides a method for joining nanotubes end-to-end, including contacting the nanotubes with a joining fluid. The joining fluid has at least one property that is different from at least one property associated with ends of the nanotubes. In one embodiment, the method further includes contacting the nanotubes with a treating fluid before the nanotubes are contacted with the joining fluid. The treating fluid can be immiscible in the joining fluid. In this embodiment, the method can further include removing the bulk first fluid before contacting the nanotubes with the second, joining fluid to effect end-to-end joining of the nanotubes. As used herein, the term "immiscible" refers to two fluid phase which do not form a homogeneous mixture. The method can further include the step of removing the second, joining fluid.

In one embodiment, the first, treating fluid is polar or nonpolar and the second, joining fluid is polar if the treating fluid is nonpolar or the joining fluid is nonpolar if the treating fluid is polar. Other immiscible treating fluid/joining fluid pairs can also be used (for example, aqueous phases/organic phases and organic phases/fluorous phases). In several embodiments of the present invention, the treating fluid is nonpolar and the joining fluid is polar. Examples of suitable nonpolar fluids for use in the present invention include, but are not limited to, linear, branched and/or cyclic alkanes such as pentane, hexane, heptane, octane, isooctane, nonane, decane, and/or cyclohexane. Examples of polar fluids suitable for use in the present invention include, but are not limited to, water, alcohols, chloroform and/or dichloromethane.

The nanotubes can, for example, be formed from one or more amphiphilic diacetylenic compounds. In several embodiments with amphiphilic diacetylenic compounds, nonpolar/polar fluid phase pairs are used to effect end-to-end joining as described above. In several embodiments, the nanotubes are formed from one or more amphiphilic non-chiral single-chain diacetylenic compounds. The amphiphilic non-chiral compounds can, for example, have the structure:

$$W-C\equiv C-C\equiv C-V-L-QY$$

wherein the moiety $W-C\equiv C-C\equiv C-V$ is a bilayer-compatible hydrophobic chain, L is a linker group comprising a chain from about 1 to 10 atoms, and Q and Y together are an ion pair. Q can, for example, be a protonated secondary amine. In several embodiments, Q is a —$NH_2R^+$ group and R is a $C_1$ to $C_8$ alkyl group. W can, for example, be a $C_3$ to $C_{20}$ alkyl group. V can, for example, be a $C_1$ to $C_{20}$ alkylene group. In several embodiments, L is a —$CONH(CH_2)_m$ group and m is about 2 to 8.

In several embodiments of the present invention, the nanotubes are formed by self-assembly of at least one of N-(10,12-pentacosadiynoyl)-N'-ethylethylenediamine hydrobromide, N-(10,12-pentacosadiynoyl)-N',N'-diethylethylenediamine hydrobromide, N-(10,12-pentacosadiynoyl)-N',N',N'-triethylethylenediammonium bromide, N-(10,12-pentacosadiynoyl)-N'-ethylethylenediamine, and/or N-(10,12-pentacosadiynoyl)-N',N'-diethylethylenediamine.

Contacting the nanotubes with the treating fluid can, for example, include: adding the treating fluid to the nanotubes in a container and sonicating the treating fluid. The method can further include adding a support surface into the treating fluid and sonicating to attach the nanotubes to the support surface. Removing the bulk treating fluid can, for example, include removing the support surface from the container and drying the support surface. The support surface can be rinsed with the treating fluid after removal from the container and before drying. Contacting the nanotubes with the joining fluid can, for example, include adding the joining fluid to the support surface; and removing the joining fluid can include allowing the support surface to dry.

The method can further include the step of polymerizing the end-to-end joined nanotubes. For example, nanotubes formed from amphiphilic diacetylenic compound can be irradiated with ultraviolet light to effect polymerization.

In another aspect, the present invention provides a method for joining nanotubes end-to-end, including: associating a physiochemical property with ends of the nanotubes and contacting the nanotubes with a fluid having properties different from the physiochemical property to effect end-to-end joining of the nanotubes.

In still another aspect, the present invention provides a composition including end-to-end joined nanotubes formed by: contacting nanotubes with a joining fluid to effect end-to-end joining of the nanotubes, wherein the joining fluid has at least one property that is different from at least one property associated with ends of the nanotubes. In one embodiment, before the nanotubes are contacted with the joining fluid, the nanotubes are contacted with a treating fluid as described above. The bulk treating fluid can be removed before contacting the nanotubes with a joining fluid. The joining fluid is immiscible in the treating fluid.

Among a variety of potential uses, the connection/association and disconnection/dissociation of nanotubes of the present invention can, for example, provide the potential for the connection of two electronic circuits and for the connection of a nano-bridge between neuronal cells.

BRIEF DESCRIPTION OF THE FIGURES

FIG. 2A illustrates an SEM image of "short" nanotubes on a glass slide.

FIG. 2B illustrates an SEM image of "long" or end-to-end joined nanotubes on a glass slide.

FIG. 2C illustrates another SEM image of "long" or end-to-end joined nanotubes on a glass slide.

FIG. 3A illustrates a TEM images of end-to-end joined nanotubes showing joints therebetween.

FIG. 3B illustrates another TEM images of end-to-end joined nanotubes showing joints therebetween.

DETAILED DESCRIPTION OF THE INVENTION

As used herein and in the appended claims, the singular forms "a," "an", and "the" include plural references unless the content clearly dictates otherwise. Thus, for example, reference to "a cyclic moiety" includes a plurality of such cyclic moieties and equivalents thereof known to those skilled in the art, and so forth, and reference to "the nanotube" is a reference to one or more such nanotubes and equivalents thereof known to those skilled in the art, and so forth. All publications, patent applications, patents, and other references mentioned herein are incorporated by reference in their entirety.

As described above, the present invention generally provides a method for the end-to-end joining of nanotubes. In several embodiments, the present invention takes advantage of one or more physiochemical properties associated with the ends of the nanotubes. Nanotubes having a certain property associated with the ends thereof are contacted with or placed within a fluid which has a property that is different from or incompatible with the property of the nanotube ends.

Figure 1B:
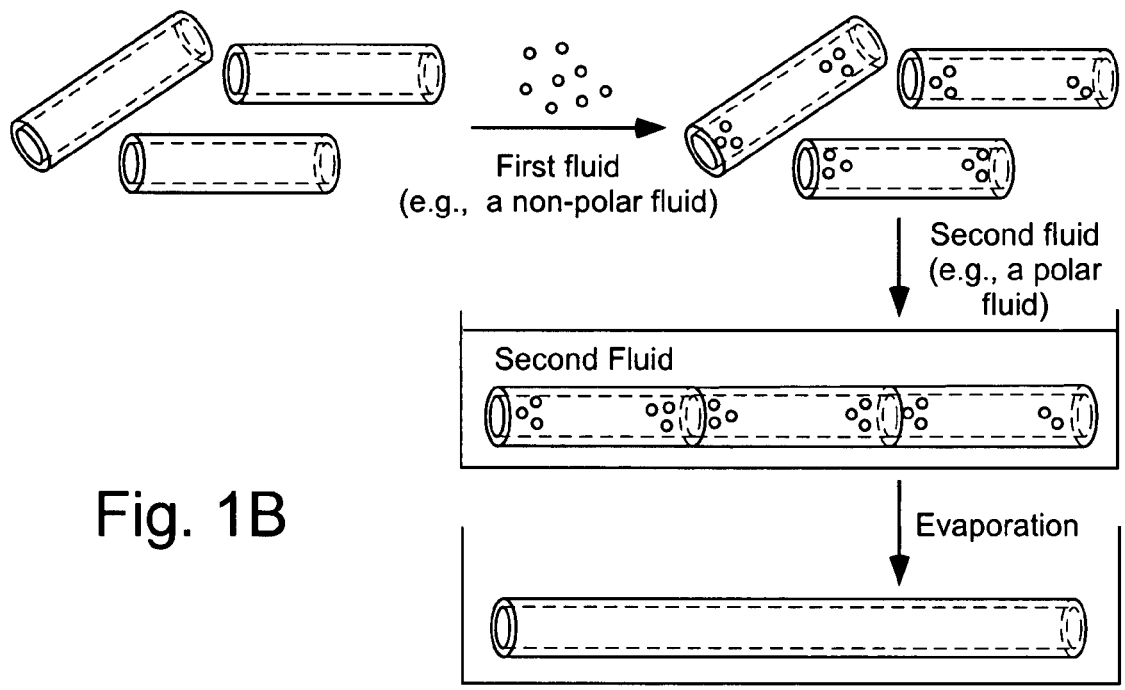
FIG. 1B illustrates end-to-end joining of nanotubes wherein the properties of the nanotubes ends are enhanced or altered by associating a first or treating substance with the nanotube ends.
Figure 1A:
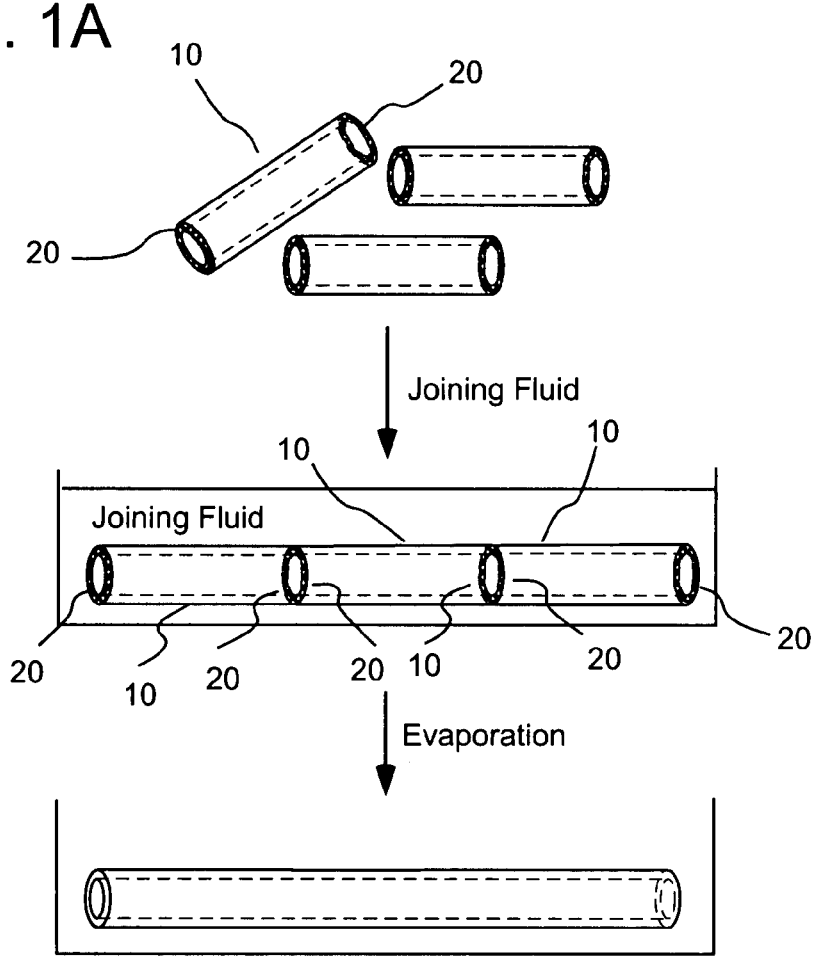
FIG. 1A illustrates end-to-end joining of nanotubes such as diacetylenic nanotubes taking advantage of characteristic physiochemical properties of the nanotubes end.

The property associated with the ends of the nanotubes can be a physiochemical property of the nanotube itself. For example, both ends of self-assembled diacetylenic nanotubes may be hydrophobic as, for example, compared to the inner and outer wall of the nanotube where hydrophilic head groups are exposed. FIG. 1A illustrates nanotubes 10 having ends 20 that have one or more physiological properties associated therewith. For example, ends 20 can be hydrophobic as in the case of diacetylenic nanotubes. The nanotubes are contact with or placed within a "joining" fluid that has properties that are different from or incompatible with the property of the nanotube ends as described above (see Example 2 below). Without limitation to any mechanism, it is believed that the nanotube ends, which share a like property, have an affinity for each other, resulting in an end-to-end joining of the nanotubes when the nanotubes are within the joining fluid. After end-to-end joining is achieved as illustrated in FIG. 1A, the joining fluid can be removed (for example, evaporated) to leave the end-to-end joined nanotubes.

One or more properties associated with the ends of the nanotubes can also be enhanced or altered. For example, the nanotubes can be contacted with or placed within a first or treating fluid having the property or properties desired to be associated with nanotube ends as illustrated in FIG. 1B (see also, Example 3 below). Without limitation to any mechanism, it is believed that some of the chemical entities of the first fluid become associated with the nanotube ends. The treated nanotubes are then contacted with or placed within a second or joining fluid that has properties that are different from or incompatible with the properties of the first fluid (and thus, different from properties associated with the nanotube ends). As described above, and without limitation to any mechanism, it is believed that the nanotube ends, which share a like property (as enhanced or provided by the first fluid), have an affinity for each other, resulting in an end-to-end joining of the nanotubes when the nanotubes are within the second or joining fluid.

Several aspects of the present invention are described herein through representative examples of end-to-end joining and polymerization of end-to-end joined self-assembled, diacetylene nanotubes having generally uniform dimensions. In several representative studies of the present invention end-to-end joining of the diacetylene nanotubes was effected by sequential contacting of the nanotubes with a nonpolar fluid, and then a polar fluid as described above. In that regard, diacetylenic nanotubes can be contacted with or placed within a first, non-polar fluid to associate a non-polar chemical entity (for example, hexane) with the hydrophobic ends of the diacetylenic nanotubes. The diacetylenic nanotubes are then placed within a second, polar fluid (for example, methanol) in which the nanotube ends align and join as described above and as illustrated in FIG. 1B The remarkable ability of achiral amphiphilic diacetylenes with secondary amine salt head groups to form uniform self-assembled nanotubes has been described in S. Lee, et al., *J. Am. Chem. Soc.* (2004) 126:13400-13405, the disclosure of which is incorporated herein by reference. It has also been shown that the diacetylene molecules in these nanotubes are well-aligned and amenable to polymerization. See, S. Lee, et al., *Nano Letters*, (2005) 5:11, 2202-2206, the disclosure of which is incorporated herein by reference. The synthesis and/or polymerization of such nanotubes are also described in Published PCT International Applications WO 2006/08589 and WO 2006/132662, the disclosures of which are incorporated herein by reference.

Suitable diacetylenic nanotubes for use in the present invention include, but are not limited to, those formed by self-assembly of at least one compound having formula

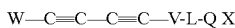

wherein the moiety W—C≡C—C≡C—V is a bilayer-compatible hydrophobic chain, L is a linker comprising a chain of from 1 to 10 atoms, and Q and X together are an ion pair. In several embodiments, the compound has formula

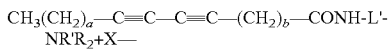

wherein a+b is from about 4 to about 30; L' is selected from the group consisting of $CH_2CH_2$, $CH_2CH_2CH_2$, and $CH_2CH_2ZCH_2CH_2$; where Z is selected from the group consisting of $CH_2$, O, S, and NR; X is a leaving group; each R is independently selected from the group consisting of hydrogen, $C_1$-$C_8$ alkyl, and $C_6$-$C_{14}$ aryl, wherein each R is optionally substituted with at least one selected from the group consisting of halogen, oxo, acyl, alkenyl, alkoxyl, alkyl, alkylamino, amino, aryl, cycloalkyl, heterocyclyl, and heterocyclylalkyl; and R' is $C_1$-$C_8$ alkyl, optionally substituted with at least one selected from the group consisting of halogen, oxo, acyl, alkenyl, alkoxyl, alkyl, alkylamino, amino, aryl, cycloalkyl, heterocyclyl, and heterocyclylalkyl.

In general, L is a "spacer" of from one to ten atoms in length. Suitable spacers include, but are not limited to, atom chains comprising $CH_2CH_2$, $CH_2CH_2CH_2$, $CH_2CH_2OCH_2CH_2$, $CH_2CH_2SCH_2CH_2$, $CH_2CH_2NHCH_2CH_2$ or $CH_2CH_2NRCH_2CH_2$, and may optionally incorporate keto, ester, and/or amide moieties. In several embodiments, the spacer comprises an amide. For example, in several embodiments, L is selected from $CONHCH_2CH_2$, $CONHCH_2CH_2CH_2$, $CONHCH_2CH_2OCH_2CH_2$, $CONHCH_2CH_2SCH_2CH_2$, or $CONHCH_2CH_2NHCH_2CH_2$.

In several embodiments, the nanotube are prepared by self-assembly of at least one of the following diacetylenes:
N-(10,12-pentacosadiynoyl)-N'-ethylethylenediamine hydrobromide,
N-(10,12-pentacosadiynoyl)-N',N'-diethylethylenediamine hydrobromide,
N-(10,12-pentacosadiynoyl)-N',N',N'-triethylethylenediammonium bromide,
N-(10,12-pentacosadiynoyl)-N'-ethylethylenediamine, and
N-(10,12-pentacosadiynoyl)-N',N'-diethylethylenediamine.

In a representative example of end-to-end joining of, for example, diacetylene nanotubes of the present invention, a non-polar solvent is added to a vial containing diacetylene nanotubes and the vial is sonicated in an ultrasonic bath to detach the nanotubes from the walls of the container. Next, the liquid is transferred to a second container and a fresh non-polar solvent is added followed by further sonication to disperse the nanotubes. A clean 25 mm×75 mm glass slide is placed in the resulting nanotube suspension to serve as a support surface, and the solution is agitated for 5 minutes to coat the glass slide with nanotubes. Without limitation to any particular mechanism, the nanotubes presumably attach themselves to the glass surface via electrostatic interactions between surface silicate anions and the quaternary or protonated amine in the diacetylene monomer head group, and/or by hydrogen-bonding interactions. The slide is then briefly rinsed with the same solvent and dried overnight in vacuo at room temperature.

Suitable non-polar fluids/solvents for use in the present invention can, for example, be linear, branched, or cyclic alkanes, and include, but are not limited to, pentane, hexane, heptane, octane, isooctane, nonane, decane, cyclohexane, and the like, as well as mixtures thereof. Sonication is typically conducted in a water bath at room temperature. An ultrasonic bath with a power level of 100 W is suitable; the sonication method is preferably continuous rather than pulsed.

After removal of the bulk non-polar fluid from the surface-bound nanotubes (for example, via drying overnight in vacuo at room temperature), a suitable polar fluid/solvent is, for example, added to the surface-bound nanotubes for the end-end joining. Suitable polar fluids/solvent for use in the present invention can be linear, branched, or cyclic, and include, but are not limited to, water, alcohols, hydrocarbons, and the like, and mixtures thereof.

As described above, in several embodiments, the present invention provides for the end-to-end joining of nanotubes by simple fluid/solvent treatment without the use of templates. Once again, the end-to-end joining of self-assembled diacetylenic nanotubes described in the experimental examples set forth below and a possible mechanism for the end-to-end joining of nanotubes of the present invention are illustrated in FIGS. 1A and 1B. Without limitation to any mechanism and with reference to FIG. 1B, after removal of the bulk first or treating fluid, an amount of the first fluid (hexane, for example) can remain associated with the ends and/or interior of the nanotubes. For example, the first fluid can be entrained within the nanotubes or otherwise associated with the ends of the nanotubes (for example, via a molecular interaction or via capillary action). A first fluid/fluid phase in which the fluid molecules are of suitable size to be retained within the nanotubes can be preferred. Moreover, the first/treating fluid and the second/joining fluid should be compatible with the nanotubes. For example, it is not desirable to completely solubilize the nanotubes. Upon immersion of the nanotubes in the second or treating fluid (for example, immiscible in the first fluid—for example, of "opposite" polarity to the first fluid), an interaction and/or affinity between the ends of the nanotubes may result in end-to-end joining thereof.

As described above, both ends of self-assembled diacetylenic nanotube may be slightly hydrophobic which may facilitate association/interaction of a nonpolar fluid such as hexane with the ends of the nanotubes. Diacetylenic nanotubes having a length of approximately 1 micron, first contacted with (or immersed in) hexane, were subsequently connected to each other, lengthening them up to, for example, 10 microns through contact with (or immersion in) a methanol solution. The resulting end-to-end nanotubes were much longer than the original nanotubes, but maintained the uniform diameters of the original nanotubes. FIG. 2A shows a scanning electron microscopy (SEM) image of nanotubes of the present invention on a glass slide. FIGS. 2B and 2C illustrate end-to-end joined nanotubes of the present invention on a glass slide. FIGS. 3A and 3B illustrate transmission electron microscopy (TEM) images of nanotubes showing joints between end-to-end joined nanotubes of the present invention. An inset C in FIG. 3B, illustrates an enlarged view of a nanotube joint. Complete polymerization of the nanotubes under UV light provided a reversible blue to red color transition. Such color transitions can, for example, be induced via changes in temperature, changes in pH, mechanical stresses, and exposure to various chemical and/or biochemical entities.

Although the present invention has been discussed above in connection with diacetylenic nanotubes, the methods of the present invention can be used with generally any type of nanotubes. For example, nanotubes suitable for use in the present invention include, but are not limited to, carbon nanotubes, silica nanotubes, porphyrin nanotubes, boron nitride nanotubes, tungsten disulfide nanotubes, zeolite nanotubes, polymeric lipid-based nanotubes, carbohydrate-based nanotubes, peptide nanotubes, $WS_2$ nanotubes, vanadium oxide nanotubes, polyaniline nanotubes, Au nanotubes, gallium nitride nanotubes, Fullerene nanotubes, $MoS_2$ nanotubes, InP nanotubes, rhenium(IV) sulfide nanotubes, steroid nanotubes, alumina nanotubes, titania nanotubes, tellurium nanotubes, $NbS_2$ nanotubes, block copolymer nanotubes and combinations thereof.

EXPERIMENTAL EXAMPLES

The following experimental examples illustrate several aspects of the present invention and are set forth to aid in the understanding of the invention. The experimental examples should not be construed to limit in any way the scope of the invention as defined in the claims which follow thereafter.

Example 1

Preparation of Short Nanotubes on Glass Slides

Hexane (20 mL) was added to a vial containing dried diacetylene nanotubes (10 mg) and the vial was sonicated in a sonic bath at room temperature for 5 min to detach the NTs from inside of the vial. Next, the hexane solution was transferred to a 250 mL glass bottle and fresh hexane (230 mL) was added followed by another 5 min sonication at room temperature to disperse the nanotubes. A glass slide (25 mm×75 mm) was placed in the nanotube solution and sonicated for 5 minutes to coat the glass slide with nanotubes. After the sonication was complete, the glass slide was again transferred to a 250 ml glass bottle containing fresh hexane (230 mL). The slide was rinsed for 5 minutes and the dried overnight in a vacuum oven at room temperature.

Example 2

End-to-End Joining of Nanotubes Using Only a Joining Fluid

A dried glass slide (25 mm×75 mm) coated with diacetylene nanotubes was cut into several pieces of 10 mm×10 mm slides for nanotubes connection experiment. 100 µL of polar-solvents, such as, methanol and propanol, were added on a small glass slide and allowed it to dry at room temperature for the end-to-end joining of nanotubes.

Example 3

End-to-End Joining of Nanotubes Using a Treating Fluid Followed by a Joining Fluid A dried glass slide (25 mm×75 mm) coated with nanotubes from EXAMPLE 1 was cut into several pieces of 10 mm×10 mm slides. 100 µL of hexane (as a nonpolar-solvent) was added on a small glass slide and allowed to dry at room temperature. Subsequently, 100 µL of a polar-solvent, such as, methanol and/or propanol, were added on a small glass slide and allowed to dry at room temperature for the end-to-end joining of nanotubes.

Example 4

Polymerization of Short and Long Nanotubes

Glass slides (25 mm×75 mm) coated with short or long nanotubes, as described above, were placed in a UV-crosslinker (Spectrolinker XL-1000 Spectronics Corp., Westbury, N.Y.). One side of the slide was wiped clean with tissue paper soaked with methanol so that only one side of the slide had nanotubes on the surface. The heat inside the UN-crosslinker was cooled down by the strong air flow. The nanotube containing surface faced a 6100 µW/cm$^2$ low-pressure mercury lamp, with maximum emission at 254 nm, positioned 15 cm above the glass slide. At 1 min intervals, the absorbance spectrum of the nanotubes was measured on a Perkin-Elmer spectrophotometer (model Lambda 45). Polymerization was confirmed by a reversible blue to red color transition.

The foregoing description and accompanying drawings set forth preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

We claim:

1. A method for joining nanotubes end-to-end, comprising:
   contacting the nanotubes with a treating fluid, the treating fluid being retained by the ends of the nanotubes;
   removing bulk treating fluid; and
   contacting the nanotubes with a joining fluid which is immiscible in the treating fluid, the joining fluid having at least one physiochemical property that is different from at least one physiochemical property of a treating fluid retained within the ends of the nanotubes to effect end-to-end joining of the nanotubes.

2. The method of claim 1 further comprising the step of removing the joining fluid.

3. The method of claim 1 wherein the treating fluid is polar or nonpolar and the joining fluid is polar if the treating fluid is nonpolar or the joining fluid is nonpolar if the treating fluid is polar.

4. The method of claim 3 wherein the nonpolar fluid comprises at least one of pentane, hexane, heptane, octane, isooctane, nonane, decane, or cyclohexane.

5. The method of claim 3 wherein the polar fluid comprises at least one of water, an alcohol, chloroform or dichloromethane.

6. The method of claim 1 wherein the treating fluid is nonpolar and the joining fluid is polar.

7. The method of claim 6 wherein the nanotubes are formed from one or more amphiphilic non-chiral single-chain diacetylenic compounds.

8. The method of claim 7 wherein contacting the nanotubes with the treating fluid comprises adding the treating fluid to the nanotubes in a container and sonicating the treating fluid.

9. The method of claim 8 further comprising adding a support surface into the treating fluid and sonicating to attach the nanotubes to the support surface.

10. The method of claim 9 wherein removing bulk treating fluid comprises removing the support surface from the container and drying the support surface.

11. The method of claim 10 wherein the support surface is rinsed with the treating fluid after removal from the container and before drying.

12. The method of claim 10 wherein the contacting the nanotubes with the joining fluid comprises the adding the joining fluid to the support surface, and removing the joining fluid comprises allowing the support surface to dry.

13. The method of claim 1 wherein the nanotubes are formed from one or more amphiphilic diacetylenic compounds.

14. The method of claim 13 further comprising polymerizing the end-to-end joined nanotubes by irradiating the nanotubes with ultraviolet light.

15. The method of claim 14 wherein at least one of the amphiphilic diacetylenic compounds has the structure:

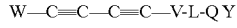

wherein the moiety W—C≡C—C≡C—V is a bilayer-compatible hydrophobic chain, wherein W is a $C_3$ to $C_{20}$ alkyl group, L is a linker group comprising a chain from about 1 to 10 atoms, and Q and Y together are an ion pair.

16. The method of claim 14 wherein the nanotubes are formed by self-assembly of at least one of
N-(10,12-pentacosadiynoyl)-N'-ethylethylenediamine hydrobromide,
N-(10,12-pentacosadiynoyl)-N',N'-diethylethylenediamine hydrobromide,
N-(10,12-pentacosadiynoyl)-N',N',N'-triethylethylenediammonium bromide,
N-(10,12-pentacosadiynoyl)-N'-ethylethylenediamine, or
N-(10,12-pentacosadiynoyl)-N',N'-diethylethylenediamine.

17. The method of claim 1 wherein the nanotubes are diacetylenic nanotubes, carbon nanotubes, silica nanotubes, porphyrin nanotubes, boron nitride nanotubes, tungsten disulfide nanotubes, zeolite nanotubes, polymeric lipid-based nanotubes, carbohydrate-based nanotubes, peptide nanotubes, $WS_2$ nanotubes, vanadium oxide nanotubes, polyaniline nanotubes, Au nanotubes, gallium nitride nanotubes, Fullerene nanotubes, $MoS_2$ nanotubes, InP nanotubes, rhenium(IV) sulfide nanotubes, steroid nanotubes, alumina nanotubes, titania nanotubes, tellurium nanotubes, $NbS_2$ nanotubes, block copolymer nanotubes or combinations thereof.

18. A method for joining nanotubes end-to-end, comprising:
contacting the nanotubes with a joining fluid; the joining fluid having at least one physiochemical property that is different from at least one physiochemical property of a treating fluid retained within the ends of the nanotubes to effect end-to-end joining of the nanotubes, wherein the nanotubes are formed from one or more amphiphilic diacetylenic compounds.

19. The method of claim 18 further comprising polymerizing the end-to-end joined nanotubes by irradiating the nanotubes with ultraviolet light.

20. The method of claim 18 wherein at least one of the amphiphilic diacetylenic compounds comprises a bilayer-compatible hydrophobic chain moiety having attached thereto the group -L-Q-Y, wherein L is a linker group comprising a chain from about 1 to 10 atoms, and Q and Y together are an ion pair.

21. The method of claim 20 wherein Q is a protonated secondary amine.

22. The method of claim 21 wherein the bilayer-compatible hydrophobic chain moiety has the formula W—C≡C—C≡C—V, wherein W is a $C_3$ to $C_{20}$ alkyl group.

23. The method of claim 22 wherein V is a $C_1$ to $C_{20}$ alkylene group.

24. The method of claim 23 wherein L is a —CONH$(CH_2)_m$ group and m is about 2 to 8.

25. The method of claim 24 wherein Q is a —$NH_2R^+$ group and R is a $C_1$ to $C_8$ alkyl group.

26. The method of claim 18 wherein the nanotubes are formed by self-assembly of at least one of
N-(10,12-pentacosadiynoyl)-N'-ethylethylenediamine hydrobromide,
N-(10,12-pentacosadiynoyl)-N',N'-diethylethylenediamine hydrobromide,
N-(10,12-pentacosadiynoyl)-N',N',N'-triethylethylenediammonium bromide,
N-(10,12-pentacosadiynoyl)-N'-ethylethylenediamine, or
N-(10,12-pentacosadiynoyl)-N',N'-diethylethylenediamine.

27. A composition comprising end-to-end joined nanotubes formed by:
contacting the nanotubes with a treating fluid, the treating fluid being retained by the ends of the nanotubes;
removing bulk treating fluid; and
contacting nanotubes with the joining fluid, which is immiscible in the treating fluid, the joining fluid having at least one physiochemical property that is different from at least one physiochemical property of a treating fluid retained within the ends of the nanotubes to effect end-to-end joining of the nanotubes.

28. The composition of claim 27 wherein the joining fluid is removed from contact with the end-to-end joined nanotubes.

29. The composition of claim 27 wherein the treating fluid is polar or nonpolar and the joining fluid is polar if the treating fluid is nonpolar or the joining fluid is nonpolar if the treating fluid is polar.

30. The composition of claim 29 wherein the nonpolar fluid comprises at least one of pentane, hexane, heptane, octane, isooctane, nonane, decane, or cyclohexane.

31. The composition of claim 29 wherein the polar fluid comprises at least one of water, an alcohol, chloroform or dichloromethane.

32. The composition of claim 27 wherein the treating fluid is nonpolar and the joining fluid is polar.

33. The composition of claim 32 wherein the nanotubes are formed from one or more amphiphilic non-chiral single-chain diacetylenic compounds.

34. The composition of claim 33 wherein the treating fluid is added to the nanotubes in a container and the treating fluid is sonicated.

35. The composition of claim 34 wherein a support surface is added into the treating fluid and the treating fluid is sonicated to attach the nanotubes to the support surface.

36. The composition of claim 35 wherein the support surface is removed from the container and dried.

37. The composition of claim 36 wherein the support surface is rinsed with the treating fluid after removal from the container and before drying.

38. The composition of claim 37 wherein the joining fluid is added to the support surface and the support surface is subsequently removed from the joining fluid and dried.

39. The composition of claim 27 wherein the nanotubes are formed from one or more amphiphilic diacetylenic compounds.

40. The composition of claim 39 wherein at least one of the amphiphilic diacetylenic compounds comprises a bilayer-compatible hydrophobic chain moiety having attached thereto the group -L-Q-Y, wherein L is a linker group comprising a chain from about 1 to 10 atoms, and Q and Y together are an ion pair.

41. The composition of claim 40 wherein Q is a protonated secondary amine.

42. The composition of claim 41 wherein the bilayer-compatible hydrophobic chain moiety has the formula W—C≡C—C≡C—V, wherein W is a $C_3$ to $C_{20}$ alkyl group.

43. The composition of claim 42 wherein V is a $C_1$ to $C_{20}$ alkylene group.

44. The composition of claim 43 wherein L is a —CONH$(CH_2)_m$ group and m is about 2 to 8.

45. The composition of claim 44 wherein Q is a —$NH_2R^+$ group and R is a $C_1$ to $C_8$ alkyl group.

46. The composition of claim 39 wherein the end-to-end joined nanotubes are polymerized by irradiating the nanotubes with ultraviolet light.

47. The composition of claim 46 wherein at least one of the amphiphilic non-chiral compounds has the structure:

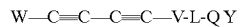

wherein the moiety W—C≡C—C≡C—V is a bilayer-compatible hydrophobic chain, wherein W is a $C_3$ to $C_{20}$ alkyl group, L is a linker group comprising a chain from about 1 to 10 atoms, and Q and Y together are an ion pair.

48. The composition of claim 46 wherein the nanotubes are formed by self-assembly of at least one of
N-(10,12-pentacosadiynoyl)-N'-ethylethylenediamine hydrobromide,
N-(10,12-pentacosadiynoyl)-N',N'-diethylethylenediamine hydrobromide,
N-(10,12-pentacosadiynoyl)-N',N',N'-triethylethylenediammonium bromide,
N-(10,12-pentacosadiynoyl)-N'-ethylethylenediamine, or
N-(10,12-pentacosadiynoyl)-N',N'-diethylethylenediamine.

49. The composition of claim 27 wherein the nanotubes are diacetylenic nanotubes, carbon nanotubes, silica nanotubes, porphyrin nanotubes, boron nitride nanotubes, tungsten disulfide nanotubes, zeolite nanotubes, polymeric lipid-based nanotubes, carbohydrate-based nanotubes, peptide nanotubes, $WS_2$ nanotubes, vanadium oxide nanotubes, polyaniline nanotubes, Au nanotubes, gallium nitride nanotubes, Fullerene nanotubes, $MoS_2$ nanotubes, InP nanotubes, rhenium(IV) sulfide nanotubes, steroid nanotubes, alumina nanotubes, titania nanotubes, tellurium nanotubes, $NbS_2$ nanotubes, block copolymer nanotubes or a combination thereof.

* * * * *